US012149013B2

(12) United States Patent
Huang et al.

(10) Patent No.: US 12,149,013 B2
(45) Date of Patent: Nov. 19, 2024

(54) ARRAY ANTENNA

(71) Applicant: PEGATRON CORPORATION, Taipei (TW)

(72) Inventors: Chin-Ting Huang, Taipei (TW); Hsi-Kai Hung, Taipei (TW); Sony Chayadi, Taipei (TW); Chun-Kai Wang, Taipei (TW)

(73) Assignee: PEGATRON CORPORATION, Taipei (TW)

( * ) Notice: Subject to any disclaimer, the term of this patent is extended or adjusted under 35 U.S.C. 154(b) by 141 days.

(21) Appl. No.: 17/987,346

(22) Filed: Nov. 15, 2022

(65) Prior Publication Data

US 2023/0223698 A1 Jul. 13, 2023

(30) Foreign Application Priority Data

Jan. 11, 2022 (TW) ................................ 111200331

(51) Int. Cl.
*H01Q 9/04* (2006.01)
*H01Q 21/08* (2006.01)

(52) U.S. Cl.
CPC ........... *H01Q 9/0485* (2013.01); *H01Q 21/08* (2013.01)

(58) Field of Classification Search
CPC .. H01Q 9/044; H01Q 9/0407; H01Q 9/04071; H01Q 9/0414; H01Q 9/0485; H01Q 21/0031; H01Q 21/06; H01Q 21/08; H01Q 1/422; H01Q 15/0006; H01Q 15/0013; H01Q 15/0026; H01Q 3/24
See application file for complete search history.

(56) References Cited

U.S. PATENT DOCUMENTS

| | | | | |
|---|---|---|---|---|
| 6,448,930 | B1 * | 9/2002 | Judd | H01Q 1/007 343/700 MS |
| 7,034,749 | B2 * | 4/2006 | Leeper | H01Q 3/02 343/754 |
| 7,245,261 | B2 * | 7/2007 | Zafar | H01Q 3/06 343/846 |
| 7,403,172 | B2 * | 7/2008 | Cheng | H01Q 9/0407 343/824 |
| 9,647,328 | B2 * | 5/2017 | Dobric | H01Q 9/0428 |
| 10,263,332 | B2 * | 4/2019 | Yong | H01Q 1/243 |
| 10,833,392 | B1 * | 11/2020 | Zekios | H01Q 15/0013 |

(Continued)

FOREIGN PATENT DOCUMENTS

| | | |
|---|---|---|
| CN | 107919529 | 4/2018 |
| TW | M600485 | 8/2020 |

*Primary Examiner* — Jason M Crawford
(74) *Attorney, Agent, or Firm* — J.C. PATENTS

(57) ABSTRACT

An array antenna includes a ground plane, a first dielectric element, a second dielectric element, a first radiator, and a second radiator. The first dielectric element includes a first surface and a second surface, and a first included angle is formed between the first surface and the second surface. The second dielectric element includes a third surface and a fourth surface, and a second included angle is formed between the third surface and the fourth surface. The first surface is adjacent to the third surface. The first radiator includes a first part and a second part. The first part is disposed on the first surface, and the second part is disposed on the second surface. The second radiator includes a third part and a fourth part. The third part is disposed on the third surface, and the fourth part is disposed on the fourth surface.

12 Claims, 12 Drawing Sheets

(56) References Cited

U.S. PATENT DOCUMENTS

| | | | | |
|---|---|---|---|---|
| 11,165,168 | B2 * | 11/2021 | Kim | H01Q 5/35 |
| 11,588,222 | B2 * | 2/2023 | Ryoo | H01Q 9/045 |
| 11,786,146 | B1 * | 10/2023 | Filipovic | A61B 5/1176 455/557 |
| 2005/0110683 | A1 * | 5/2005 | Song | H01Q 25/005 343/846 |
| 2010/0109965 | A1 * | 5/2010 | Foo | H01Q 25/00 343/836 |
| 2014/0232605 | A1 * | 8/2014 | Kim | H01Q 15/10 343/705 |
| 2016/0226154 | A1 * | 8/2016 | Chang | H01Q 21/20 |
| 2017/0264012 | A1 * | 9/2017 | Clark | H01Q 1/523 |
| 2018/0159208 | A1 * | 6/2018 | Ameri | H01Q 21/28 |
| 2020/0106190 | A1 * | 4/2020 | Jan | H01Q 21/28 |
| 2020/0144724 | A1 * | 5/2020 | Farkas | H01Q 21/20 |
| 2021/0126366 | A1 * | 4/2021 | Sudo | H01Q 5/378 |
| 2021/0242569 | A1 * | 8/2021 | Fujii | H01Q 21/08 |
| 2021/0359423 | A1 * | 11/2021 | Huang | H01Q 3/30 |
| 2022/0077579 | A1 * | 3/2022 | Wang | H01Q 13/0283 |
| 2022/0190464 | A1 * | 6/2022 | Gavagnin | B33Y 10/00 |
| 2023/0137645 | A1 * | 5/2023 | Shen | H01Q 21/24 |
| 2023/0209730 | A1 * | 6/2023 | Fujii | H05K 1/03 174/250 |
| 2023/0223698 | A1 * | 7/2023 | Huang | H01Q 21/08 343/702 |
| 2024/0145926 | A1 * | 5/2024 | Ueda | H01Q 21/065 |

* cited by examiner

ARRAY ANTENNA

CROSS-REFERENCE TO RELATED APPLICATION

This application claims the priority benefit of Taiwan application serial no. 111200331, filed on Jan. 11, 2022. The entirety of the above-mentioned patent application is hereby incorporated by reference herein and made a part of this specification.

BACKGROUND

Technology Field

The disclosure relates to an antenna, and more particularly, to an array antenna.

Description of Related Art

The establishment of 5G mobile networks is gradually mature, and the demand for the functions and performance of millimeter-wave antenna devices is also increasing. A radiation coverage area of the antenna device will affect the communication transmission range of 5G mobile communication products, and even affect the layout of establishment of 5G mobile network devices. When the antenna device excites in a resonant mode, a radiation pattern is generated by beamforming. Therefore, a beamforming bandwidth determines the radiation coverage area of the antenna device.

In order to expand the radiation coverage area of the antenna device, the antenna device is improved to increase the beamforming bandwidth of the antenna device. In addition, it is an urgent issue to be solved in the art to improve the radiation range of the antenna device.

SUMMARY

The disclosure provides an array antenna with a larger radiation coverage area.

An array antenna in the disclosure includes a ground plane, a first dielectric element, a second dielectric element, a first radiator, and a second radiator. The first dielectric element is disposed on the ground plane. The first dielectric element includes a first surface and a second surface, and a first included angle is formed between the first surface and the second surface. The second dielectric element is disposed on the ground plane. The second dielectric element includes a third surface and a fourth surface, and a second included angle is formed between the third surface and the fourth surface. The first dielectric element and the second dielectric element are mirrored, and the first surface is adjacent to the third surface. The first radiator includes a first part and a second part. The first part is disposed on the first surface and includes a first feeding end, and the second part is disposed on the second surface. The second radiator includes a third part and a fourth part. The third part is disposed on the third surface and includes a second feeding end, and the fourth part is disposed on the fourth surface.

Based on the above, in the array antenna in the disclosure, the first dielectric element includes the first surface and the second surface inclined to the first surface, and the second dielectric element includes the third surface and the fourth surface inclined to the third surface, so that the first radiator and the second radiator respectively disposed on the first dielectric element and the second dielectric element include the inclined second part and the inclined fourth part respectively. The array antenna increases the coverage of an output beam of the array antenna through the inclined second part and the inclined fourth part, so that a radiation coverage area of the array antenna is increased.

DETAILED DESCRIPTION OF DISCLOSED EMBODIMENTS

Figure 1A:
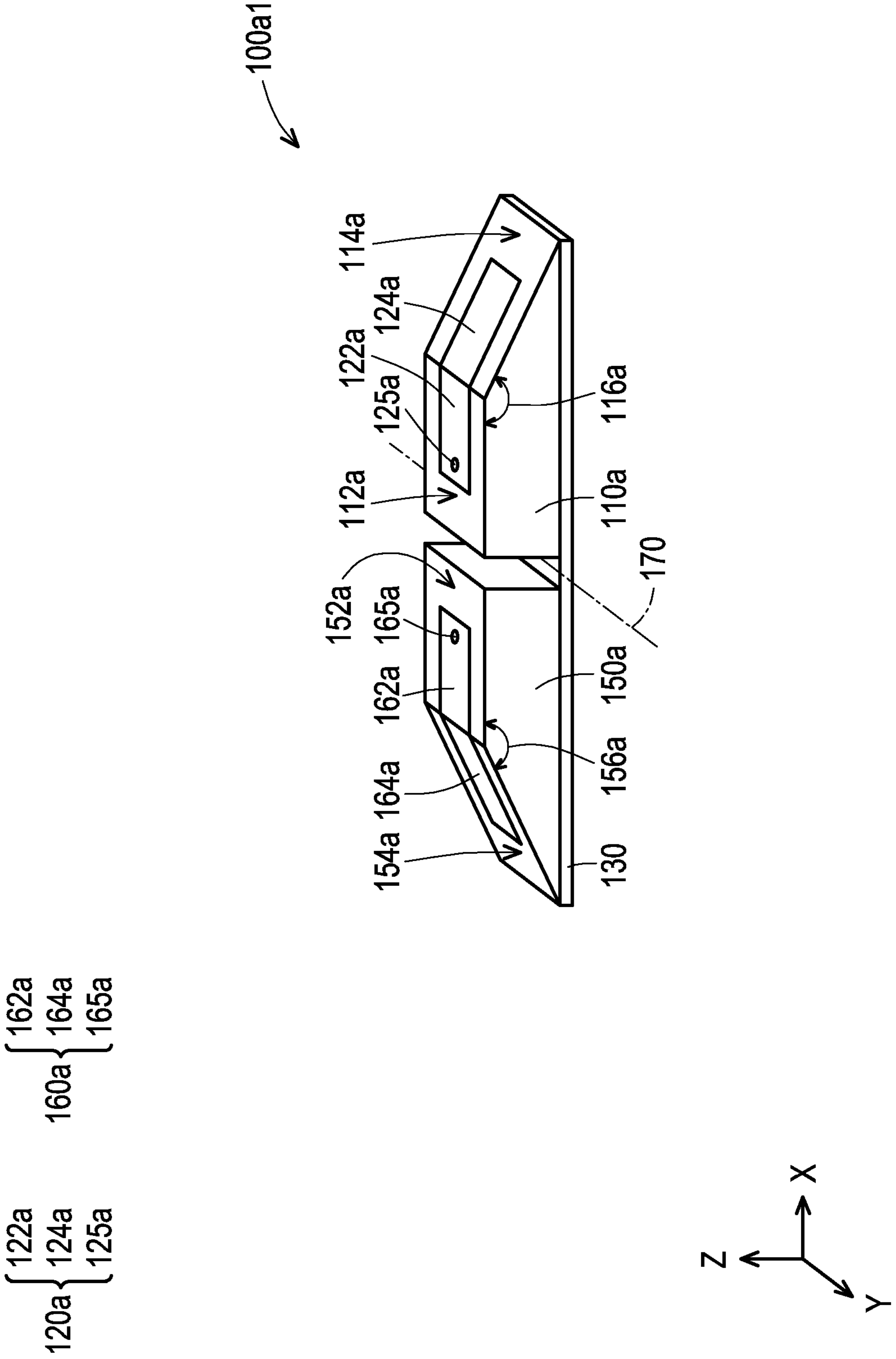
FIG. 1A is a schematic perspective view of an array antenna according to an embodiment of the disclosure.

FIG. 1A is a schematic view of an array antenna according to an embodiment of the disclosure. Cartesian coordinates X, Y, and Z are provided in the drawings to facilitate the description of components. Referring to FIG. 1A, an array antenna **100*a*1 in this embodiment includes a first dielectric element 110*a*, a second dielectric element 150*a*, a first radiator 120*a*, a second radiator 160*a*, and a ground plane 130**.

The first dielectric element **110*a* and the second dielectric element 150*a* are disposed on the ground plane 130. The first radiator 120*a* is disposed on the first dielectric element 110*a*, and the second radiator 160*a* is disposed on the second dielectric element 150*a*, so that the first dielectric element 110*a* and the second dielectric element 150*a* are located between the first radiator 120*a*, the second radiator 160*a*, and the ground plane 130, respectively. The array antenna 100*a*1 in this embodiment may be connected to an external element (not shown) through the ground plane 130 relative to another side of the first dielectric element 110*a* and the second dielectric element 150*a*. The external element is, for example, a motherboard, but the disclosure is not limited thereto. In this embodiment, the first dielectric element 110*a* and the second dielectric element 150*a*** are disposed at intervals, but the disclosure is not limited thereto.

As shown in FIG. 1A, the first dielectric element **110*a* and the second dielectric element 150*a* in this embodiment are mirrored along a center line 170, so that the first radiator 120*a* and the second radiator 160*a* are also mirrored along the center line 170. The first dielectric element 110*a* and the second dielectric element 150*a* along with the first radiator 120*a* and the second radiator 160*a* are arranged in a one-by-two array, but the disclosure is not limited thereto. The first dielectric element 110*a* in this embodiment includes a first surface 112*a* and a second surface 114*a*. A first included angle 116*a* is formed between the first surface 112*a* and the second surface 114*a*, and an angle of the first included angle 116*a* may reflect a relative inclination of the first surface 112*a* to the second surface 114*a* of the first dielectric element 110*a*. The first surface 112*a* is parallel to the ground plane 130, and the second surface 114*a* extends from the first surface 112*a* in a direction away from the first surface 112*a*, so that a projection of the first surface 112*a* onto the ground plane 130 does not overlap a projection of the second surface 114***a* onto the ground plane 130. The first dielectric element 110*a* in this embodiment is formed in a trapezoid shape, but the disclosure is not limited thereto.

As shown in FIG. 1A, the configuration of a third surface 152*a*, a fourth surface 154*a*, and a second included angle 156*a* of the second dielectric element 150*a* is similar to the configuration of the first surface 112*a*, the second surface 114*a*, and the first included angle 116*a* of the first dielectric element 110*a*. Therefore, the same details will not be repeated in the following.

In this embodiment, the first surface 112*a* of the first dielectric element 110*a* is adjacent to the third surface 152*a* of the second dielectric element 150*a*. The second surface 114*a* extends in a direction away from the third surface 152*a*, and the fourth surface 154*a* extends in the direction away from the first surface 112*a*. In other words, two sides of the array antenna 100*a*1 are inclined surfaces (the second surface 114*a* and the fourth surface 154*a*), so that the entire array antenna 100*a*1 is approximately trapezoidal.

The first included angle 116*a* in this embodiment is 160 degrees, but the disclosure is not limited thereto. For example, in other embodiments, the first included angle 116*a* is between 135 degrees and 175 degrees. More specifically, the first included angle 116*a* is between 150 degrees and 172 degrees, or the first included angle 116*a* is between 155 degrees and 165 degrees. Here, the first included angle 116*a* is the same as the second included angle 156*a*. In other words, the first dielectric element 110*a* and the second dielectric element 150*a* have the same inclination.

The first radiator 120*a* in this embodiment includes a first part 122*a* and a second part 124*a*, and the first part 122*a* includes a first feeding end 125*a*. The first part 122*a* is disposed on the first surface 112*a*, and the second part 124*a* is disposed on the second surface 114*a*. In this embodiment, an area of the first part 122*a* is the same as an area of the second part 124*a*, but the disclosure is not limited thereto.

The configuration of a third part 162*a*, a fourth part 164*a*, and a second feeding end 165*a* of the second radiator 160*a* as well as the configuration between the second radiator 160*a* and the second dielectric element 150*a* are similar to the configuration of the first radiator 120*a*. Therefore, the same details will not be repeated in the following.

In view of the above, an inclination of the first part 122*a* and the second part 124*a* of the first radiator 120*a* in this embodiment corresponds to the inclination of the first surface 112*a* and the second surface 114*a* of the first dielectric element 110*a*. An inclination of the third part 162*a* and the fourth part 164*a* of the second radiator 160*a* corresponds to an inclination of the third surface 152*a* and the fourth surface 154*a* of the second dielectric element 150*a*. Since the first dielectric element 110*a* and the second dielectric element 150*a* have the same inclination, the first radiator 120*a* and the second radiator 160*a* also have the same inclination.

A beamforming bandwidth of the array antenna 100*a*1\ when excited is increased due to angles of the first part 122*a* and the second part 124*a* and angles of the third part 162*a* and the fourth part 164*a*. In other words, in the array antenna 100*a*1, a beamforming angle of the array antenna 100*a*1 is expanded by the inclined second part 124*a* and the inclined fourth part 164*a* to increase the beamforming bandwidth and a radiation coverage area of the array antenna 100*a*1. In addition, in the array antenna 100*a*1, with the first part 122*a* and the third part 162*a* parallel to the ground plane 130, it is ensured that a gain value of a beam of the array antenna 100*a*1 in the +Z direction still has a good performance.

Figure 1B:
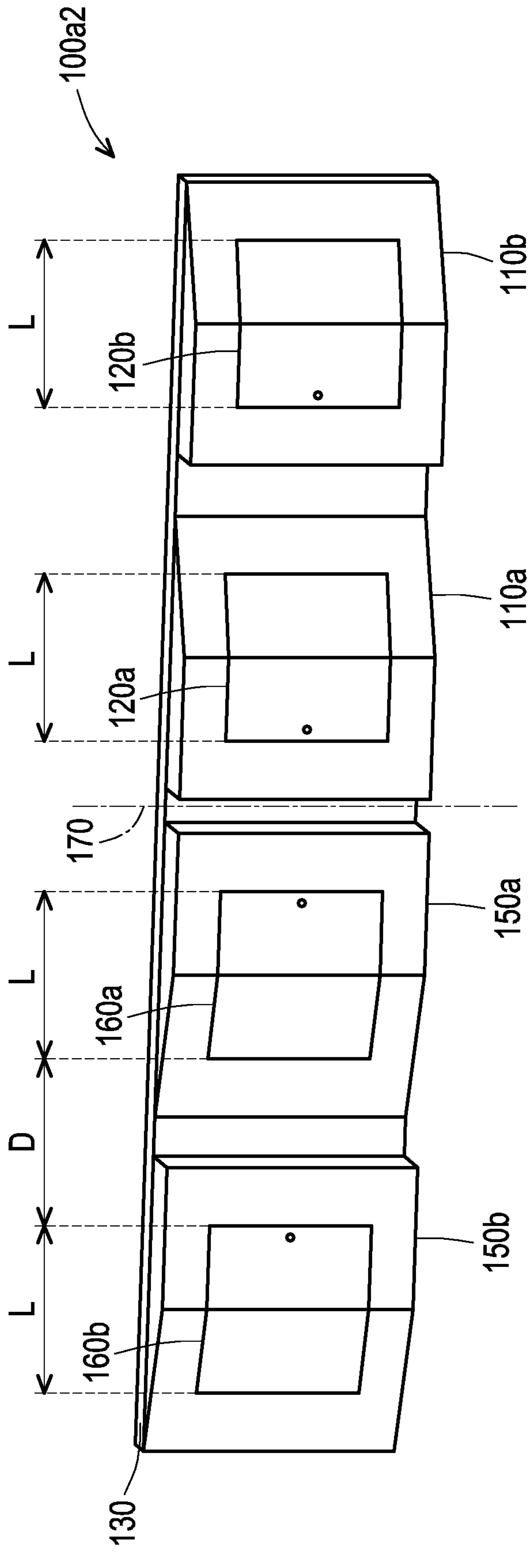
FIG. 1B is a schematic perspective view of an array antenna according to another embodiment of the disclosure.
Figure 1C:
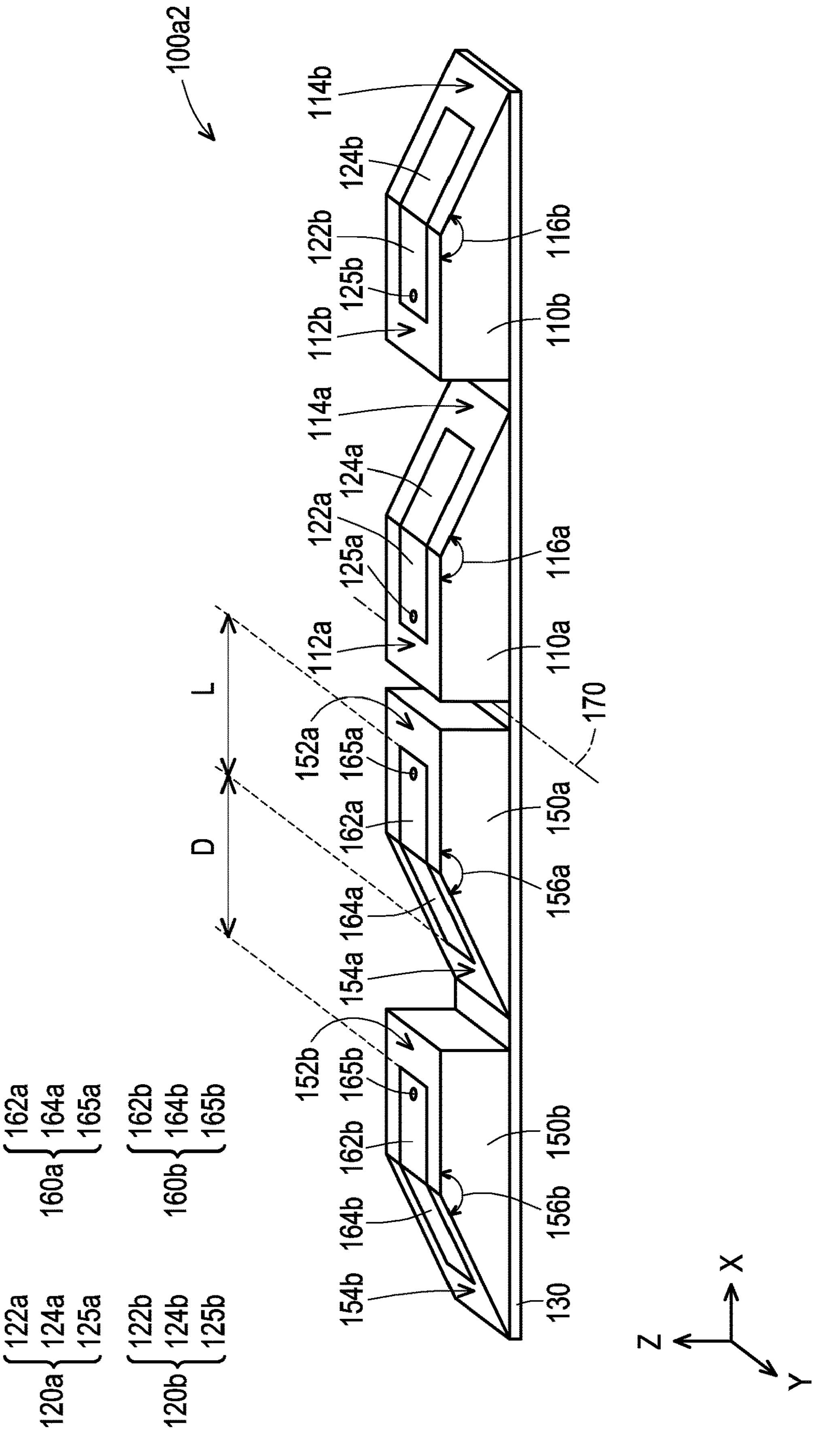
FIG. 1C is a schematic view of the array antenna in FIG. 1B at another angle.

FIG. 1B is a schematic perspective view of an array antenna according to another embodiment of the disclosure. FIG. 1C is a schematic view of the array antenna in FIG. 1B from another angle. Referring to both FIGS. 1A and 1C, an array antenna 100*a*2 in this embodiment is similar to the array antenna 100*a*1. The difference between the array antenna 100*a*2 and the array antenna 100*a*1 is that the array antenna 100*a*2 in this embodiment further includes a third dielectric element 110*b*, a fourth dielectric element 150*b*, a third radiator 120*b*, and a fourth radiator 160*b*.

Referring to both FIGS. 1B and 1C, the third dielectric element 110*b* includes a fifth surface 112*b* and a sixth surface 114*b*, and a third included angle 116*b* is formed between the fifth surface 112*b* and the sixth surface 114*b*. The fourth dielectric element 150*b* includes a seventh surface 152*b* and an eighth surface 154*b*, and a fourth included angle 156*b* is formed between the seventh surface 152*b* and the eighth surface 154*b*. A relative configuration relationship between the third dielectric element 110*b* and the fourth dielectric element 150*b* is similar to a relative configuration relationship between the first dielectric element 110*a* and the second dielectric element 150*a*. Therefore, the same details will not be repeated in the following.

The third radiator 120*b* is disposed on the third dielectric element 110*b*, and the fourth radiator 160*b* is disposed on the fourth dielectric element 150*b*. The third radiator 120*b* includes a fifth part 122*b* and a sixth part 124*b*, and the fifth part 122*b* includes a third feeding end 125*b*. The fourth radiator 160*b* includes a seventh part 162*b* and an eighth part 164*b*, and the seventh part 162*b* includes a fourth feeding end 165*b*. A relative configuration relationship between the third radiator 120*b* and the fourth radiator 160*b* is similar to a relative configuration relationship between the first radiator 120*a* and the second radiator 160*a*. Therefore, the same details will not be repeated in the following.

It is worth mentioning that, as shown in FIG. 1C, the third dielectric element 110*b* is disposed on one side of the first dielectric element 110*a* opposite to the second dielectric element 150*a*, and the fourth dielectric element 150*b* is disposed on one side of the second dielectric element 150*a* opposite to the first dielectric element 110*a*.

In brief, the first dielectric element 110*a* and the third dielectric element 110*b* are disposed on one side of the center line 170, and the second dielectric element 150*a* and the fourth dielectric element 150*b* are disposed on one side of the center line 170, so that the array antenna 100*a*2 is arranged in a one-by-four array, but the disclosure is not limited thereto. For example, in other embodiments, the array antenna 100*a*2 may be arranged in a two-by-two or other form of array.

In this embodiment, a first set of dielectric elements includes the first dielectric element 110*a* and the second dielectric element 150*a* symmetrical to the center line 170, and a second set of dielectric elements includes the third dielectric element 110*b* and the fourth dielectric element 150*b* symmetrical to the center line 170. Corresponding to the first set of dielectric elements and the second set of dielectric elements, a first set of radiators includes the first radiator 120*a* and the second radiator 160*a*, and a second set of radiators includes the third radiator 120*b* and the fourth radiator 160*b*.

The third included angle 116*b* in the second set of dielectric elements is the same as the fourth included angle 156*b* in the second set of dielectric elements. That is, the third dielectric element 110*b* and the fourth dielectric element 150*b* in the second set of dielectric elements have the same inclination.

In this embodiment, angles of the first included angle 116*a* and the second included angle 156*a* in the first set of dielectric elements are the same as angles of the third included angle 116*b* and the fourth included angle 156*b* in the second set of dielectric elements. Here, the angle of the first included angle 116*a* is 160 degrees.

Of course, the disclosure is not limited thereto. For example, in other embodiments, the angles of the first included angle 116*a* and the second included angle 156*a* in the first set of dielectric elements are greater or less than the angles of the third included angle 116*b* and the fourth included angle 156*b* in the second set of dielectric elements, thereby changing a beamforming bandwidth of the array antenna 100*a*2 and a coverage area of radiant energy.

A frequency band excited by the array antenna 100*a*2 in this embodiment is 37 GHz, but the disclosure is not limited thereto. As shown in FIG. 1B, lengths L of the first radiator 120*a*, the second radiator 160*a*, the third radiator 120*b*, and the fourth radiator 160*b* in this embodiment is ½ wavelength of the frequency band, and a distance D between two adjacent ones of the first radiator 120*a*, the second radiator 160*a*, the third radiator 120*b*, and the fourth radiator 160*b* is ½ wavelength of the frequency band.

FIGS. 2A to 2G are schematic views of simulation of two-dimensional radiation patterns of the array antenna in FIG. 1B under different conditions. When the first included angle 116*a*, the second included angle 156*a*, the third included angle 116*b*, and the fourth included angle 156*b* (FIG. 1C) of the array antenna 100*a*2 in this embodiment are all 160 degrees, a simulation experiment of two-dimensional beamforming is performed using software.

Referring to FIGS. 1C and 2A to 2G together, from left to right, FIG. 1C shows the fourth feeding end 165*b*, the second feeding end 165*a*, the first feeding end 125*a*, and the third feeding end 125*b*, respectively. The same or different current phase differences are respectively input to the four feeding ends, so that the array antenna 100*a*2 may excite in different resonant modes and generate corresponding radiation patterns 141*a*, 141*b*, 141*c*, 141*d*, 141*e*, 141*f*, and 141*g*, thereby collectively form a main beam.

FIGS. 2A to 2G only schematically show simulation results of the array antenna 100*a*2 under different resonant modes, and are not used to limit properties such as a waveform and a transmission range of an actual output beam of the array antenna 100*a*2.

FIGS. 2A to 2G further show gain values (e.g., −20, −10, 0, and 10) and angles distributed along a circumference (e.g., 0, −30, and 30). In FIGS. 2A to 2G, 0 degrees denotes the +Z axis direction; 30 degrees denotes a direction rotated 30 degrees clockwise from the +Z axis direction, and −30 degrees denotes a direction rotated 30 degrees counterclockwise from the +Z axis direction. By analogy, 90 degrees denotes the +X axis direction, and −90 degrees denotes the −X axis direction, that is, a direction parallel to the first surface 112*a* (FIG. 1C).

Figure 2A:
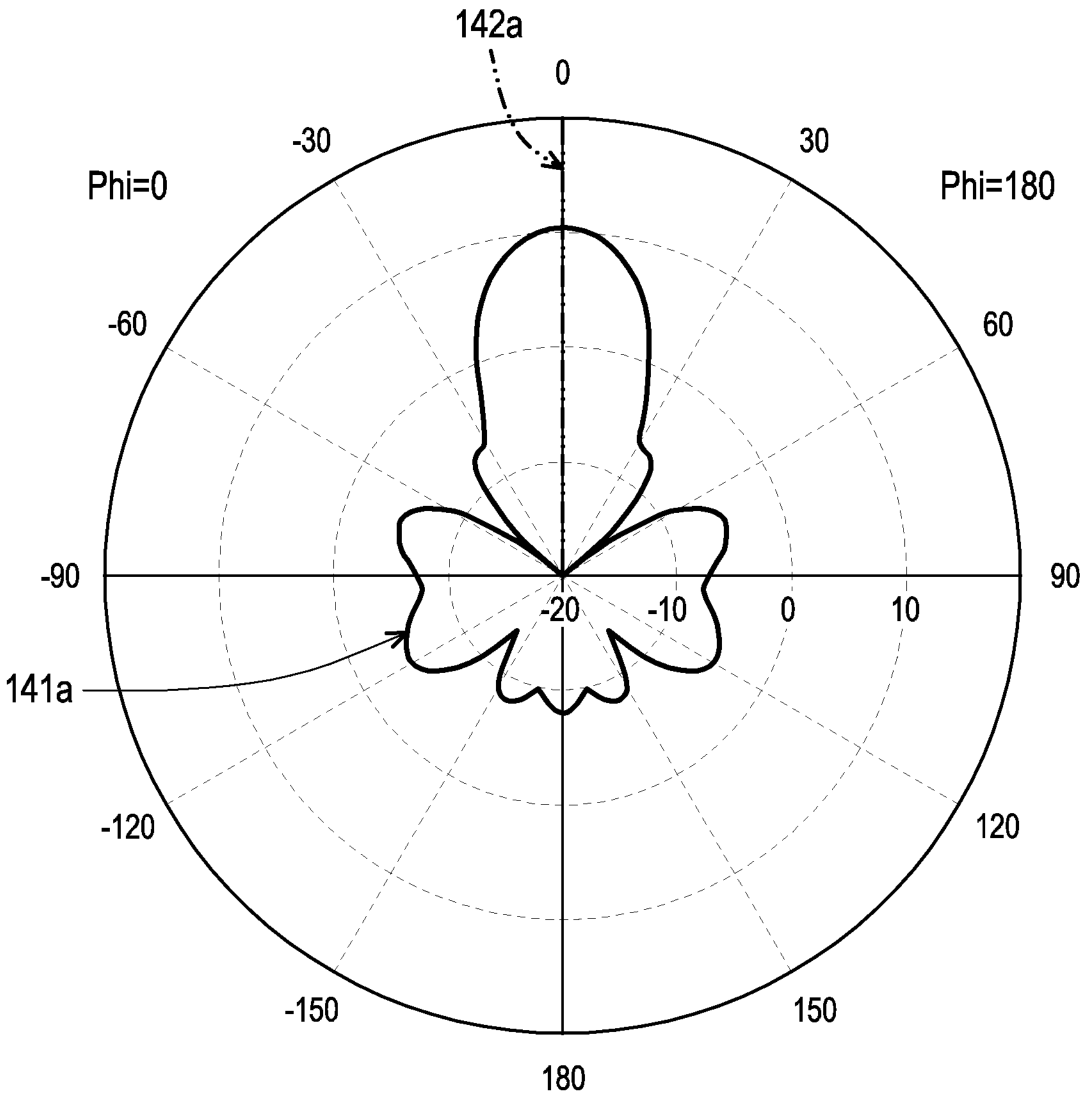
FIGS. 2A to 2G are schematic views of simulation of two-dimensional radiation patterns of the array antenna in FIG. 1B under different conditions.

As shown in FIG. 2A, current phases input to the four feeding ends in FIG. 1B from left to right are 0 degrees, 0 degrees, 180 degrees, and 180 degrees to form the radiation pattern 141*a*. The gain value of the output main beam is 10.6 dBi, and an output direction of the main beam corresponds to a line section 142*a*. An included angle between the line section 142*a* and the +Z axis is 0 degrees.

Figure 2B:
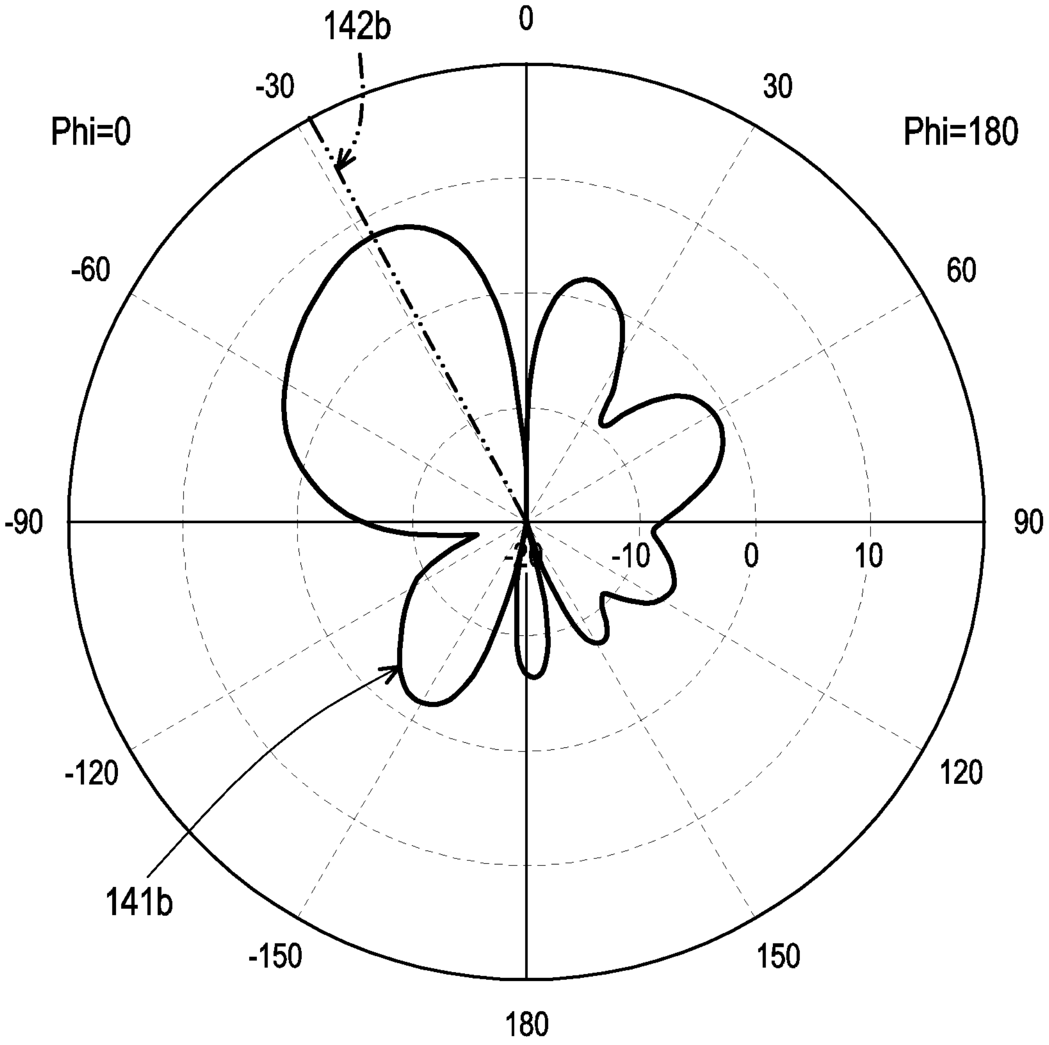

As shown in FIG. 2B, the current phases input to the four feeding ends from left to right in FIG. 1B are 0 degrees, −90 degrees, 0 degrees, and −90 degrees to form the radiation pattern 141*b*. The gain value of the output main beam is 8.2 dBi, and an included angle between a line section 142*b* and the +Z axis is −28 degrees.

Figure 2C:
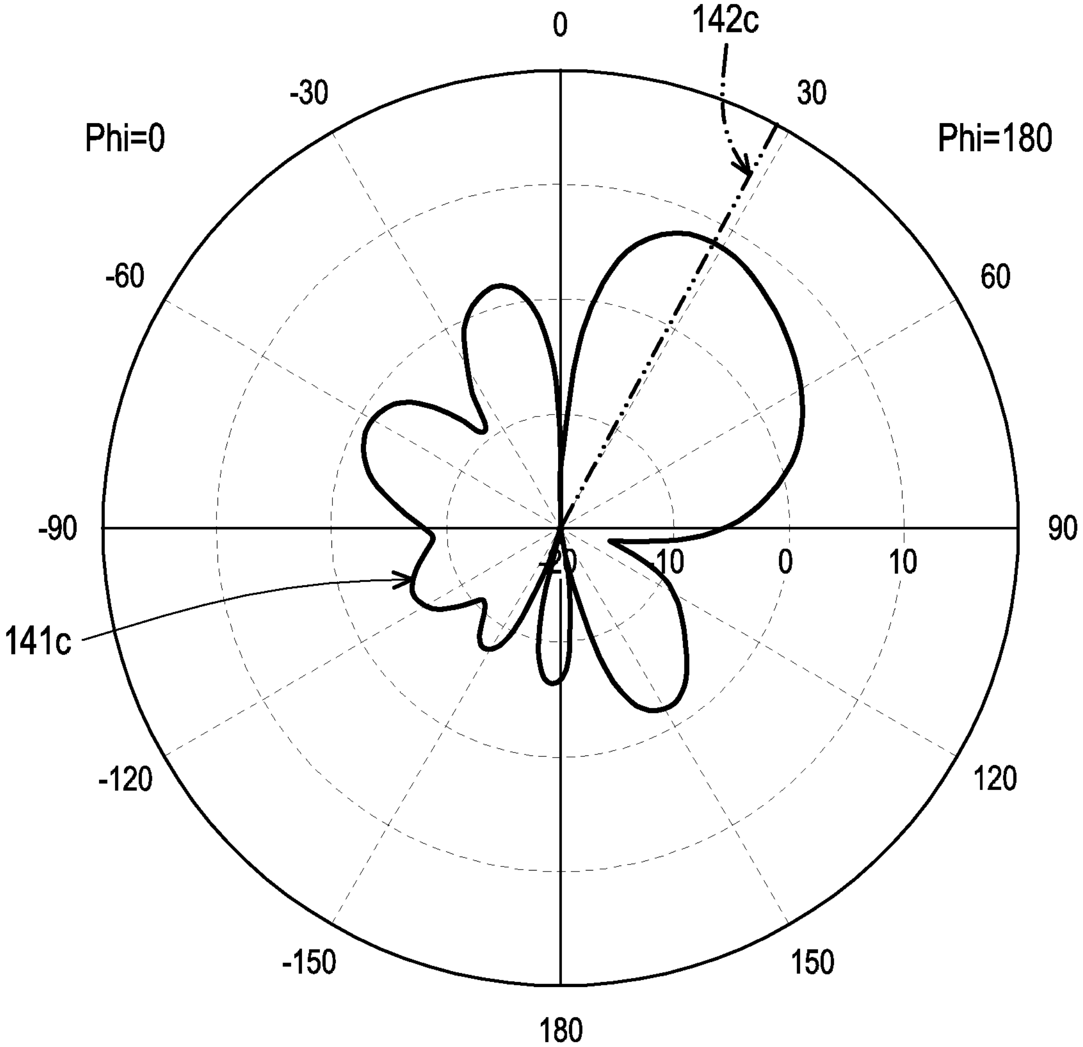

As shown in FIG. 2C, the current phases input to the four feeding ends from left to right in FIG. 1B are 0 degrees, 90 degrees, 0 degrees, and 90 degrees to form the radiation pattern 141*c*. The gain value of the output main beam is 8.2 dBi, and an included angle between a line section 142*c* and the +Z axis is 28 degrees.

Figure 2D:
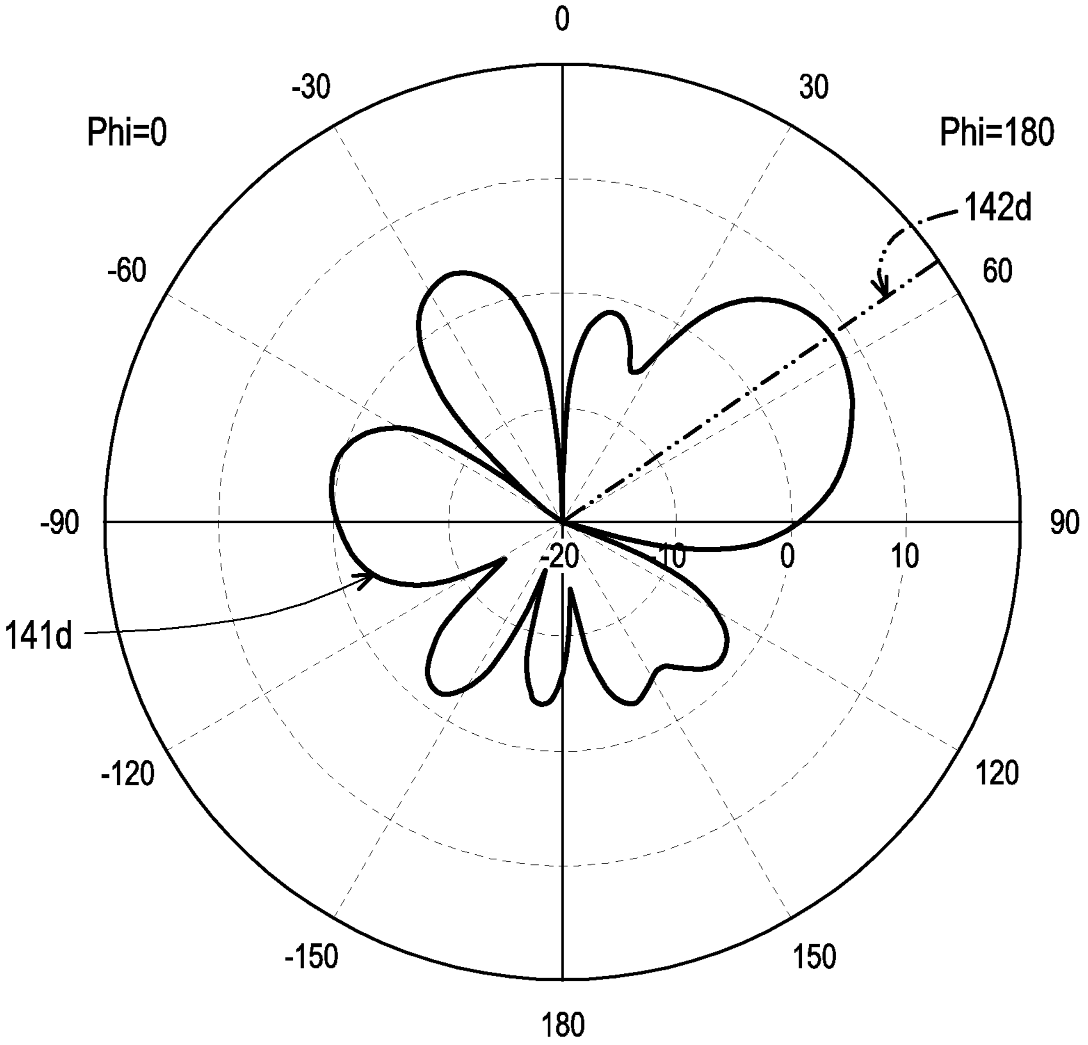

As shown in FIG. 2D, the current phases input to the four feeding ends from left to right in FIG. 1B are 0 degrees, 180 degrees, 90 degrees, and 270 degrees to form the radiation pattern 141*d*. The gain value of the output main beam is 8.3 dBi, and an included angle between a line section 142*d* and the +Z axis is 55 degrees.

Figure 2E:
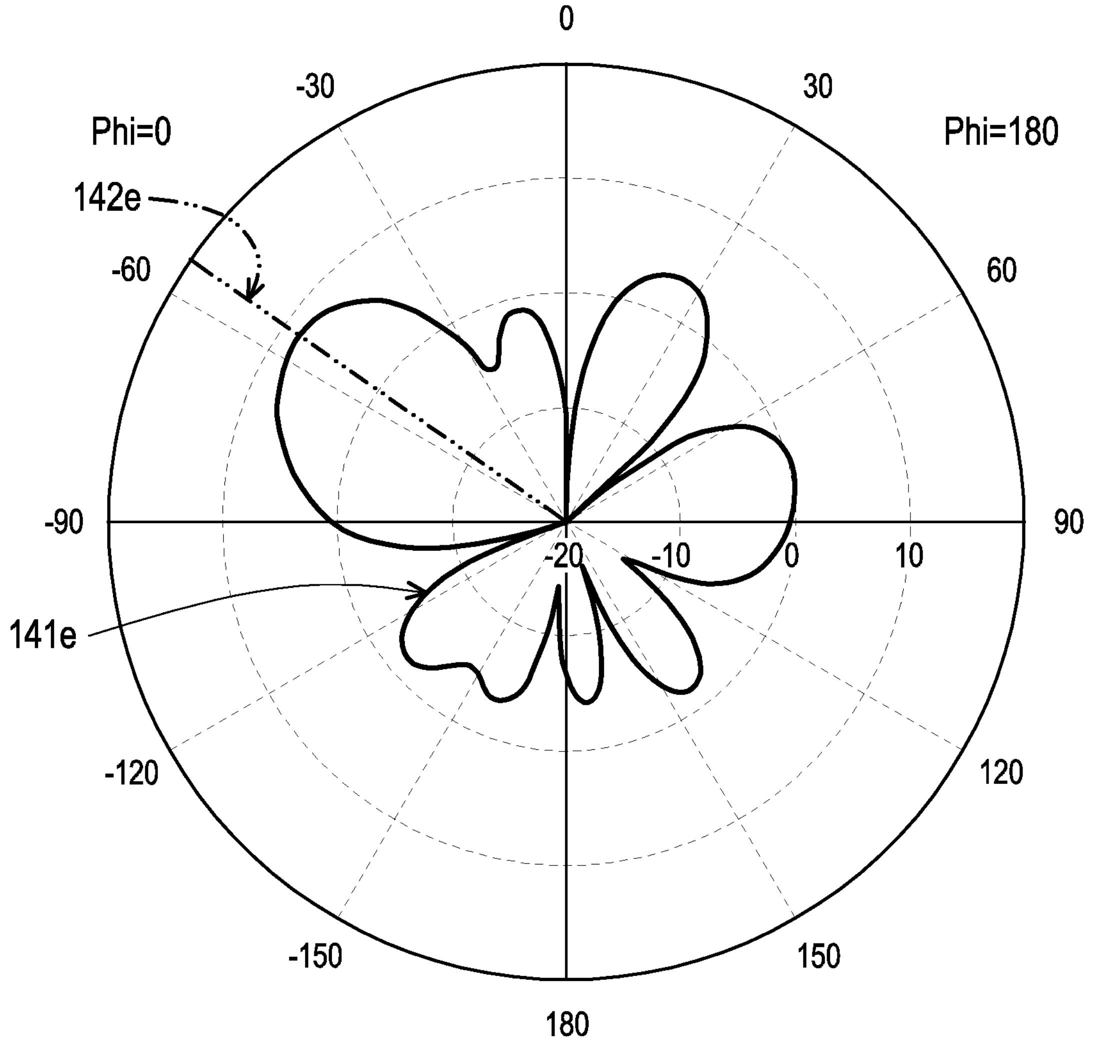

As shown in FIG. 2E, the current phases input to the four feeding ends from left to right in FIG. 1B are 0 degrees, 180 degrees, 270 degrees, and 90 degrees to form the radiation pattern 141*e*. The gain value of the output main beam is 8.3 dBi, and an included angle between a line section 142*e* and the +Z axis is −55 degrees.

Figure 2F:
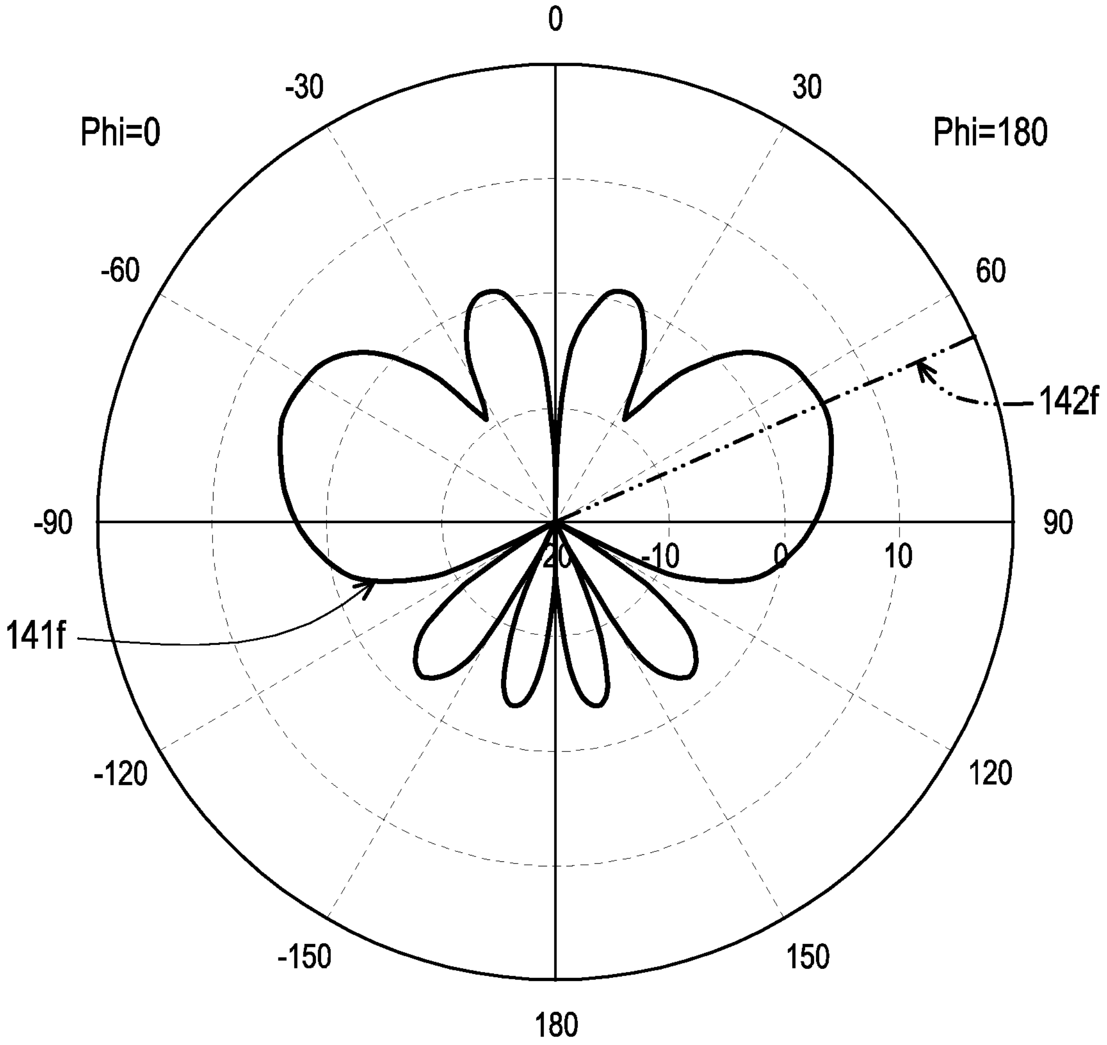

As shown in FIG. 2F, the current phases input to the four feeding ends from left to right in FIG. 1B are 0 degrees, 180 degrees, 180 degrees, and 0 degrees to form the radiation pattern 141*f*. The gain value of the output main beam is 5.8 dBi, and an included angle between a line section 142*f* and the +Z axis is 65 degrees.

Figure 2G:
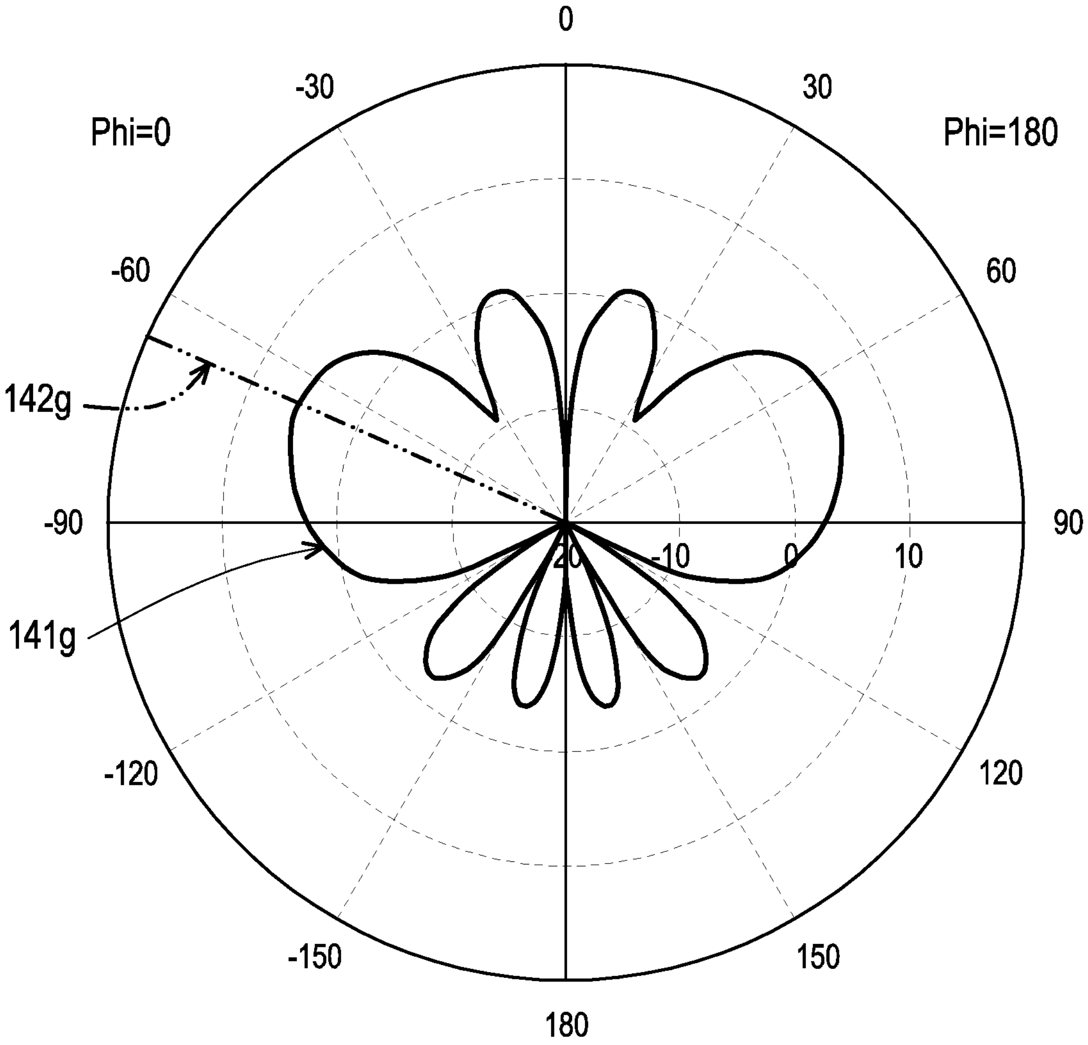

As shown in FIG. 2G, the current phases input to the four feeding ends from left to right in FIG. 1B are 0 degrees, 180 degrees, 180 degrees, and 0 degrees to form the radiation pattern 141*g*. The gain value of the output main beam is 5.8 dBi, and an included angle between a line section 142*g* and the +Z axis is −65 degrees.

According to FIGS. 2A to 2G, the included angles between the line sections 142*a*, 142*b*, 142*c*, 142*d*, 142*e*, 142*f*, and 142*g* and the +Z axis are between 65 degrees (FIG. 2F) and −65 degrees (FIG. 2G), so that the beamforming bandwidth of the array antenna 100*a*2 (FIG. 1C) reaches 130 degrees, and the gain value of the main beam in the +Z axis direction (FIG. 2A) still has the good performance.

It is worth mentioning that the current phases input to the first feeding end 125*a*, the third feeding end 125*b*, the second feeding end 165*a*, and the fourth feeding end 165*b* of the array antenna 100*a*2 are not limited to the above embodiments (FIGS. 2A to 2G). In other words, the array antenna 100*a*2 may form other resonant modes different from the above embodiments, and generate the main beams with other gain values and form the corresponding line sections. The included angles between the line sections and the +Z axis will be within a range of the above beamforming bandwidth.

A beamforming bandwidth of a conventional array antenna with a planar surface of the dielectric element is 80 degrees. In view of the above, the beamforming bandwidth of the array antenna 100*a*2 in this embodiment is about 1.6 times the beamforming bandwidth of the conventional array antenna.

Of course, the array antenna 100*a*2 in this embodiment is not limited thereto. After the simulation, in other embodiments, the first included angle 116*a*, the third included angle 116*b*, the second included angle 156*a*, and the fourth included angle 156*b* may also be 170.5 degrees, so that the gain value of the main beam of the array antenna 100*a*2 in the +Z axis direction is 11.8 dBi, and the beamforming bandwidth is 120 degrees (60 degrees to −60 degrees), which is about 1.5 times the beamforming bandwidth of the conventional array antenna.

In another embodiment, the first included angle 116*a*, the third included angle 116*b*, the second included angle 156*a*, and the fourth included angle 156*b* may also be 150 degrees, so that the gain value of the main beam of the array antenna 100*a*2 in the +Z axis direction is 10 dBi, and the beamforming bandwidth is 128 degrees (64 degrees to −64 degrees), which is about 1.6 times the beamforming bandwidth of the conventional array antenna.

In view of the above, when the array antenna 100*a*2 has the inclined second part 124*a*, sixth part 124*b*, fourth part 164*a*, and eighth part 164*b* (FIG. 1C), the beamforming bandwidth of the array antenna 100*a*2 is greater than the beamforming bandwidth of the conventional array antenna, and the gain value of the beam in the +Z axis direction still has the good performance. A user may select the suitable first included angle 116*a*, third included angle 116*b*, second included angle 156*a*, and fourth included angle 156*b* according to requirements.

Figure 3:
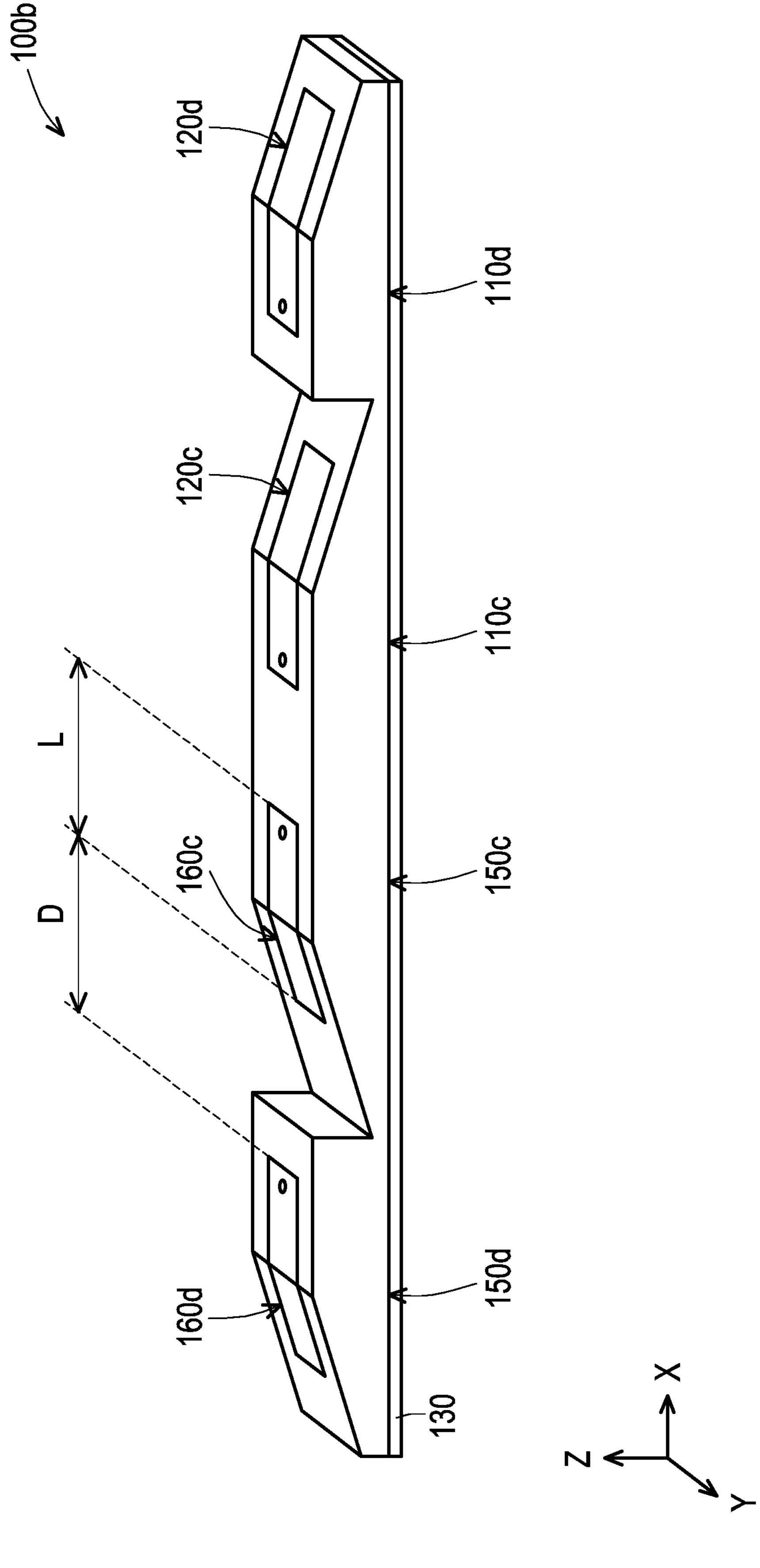
FIG. 3 is a schematic view of an array antenna according to another embodiment of the disclosure.

FIG. 3 is a schematic view of an array antenna according to another embodiment of the disclosure. Referring to both FIGS. 1C and 3, an array antenna 100*b* in this embodiment is similar to the array antenna 100*a*2. The difference between the two is that a first dielectric element 110*c*, a third dielectric element 110*d*, a second dielectric element 150*c*, and a fourth dielectric element 150*d* of the array antenna 100*b* in this embodiment are connected to one another to form a whole.

FIG. 3 schematically shows the length L of a second radiator 160*c* and the distance D between the second radiator 160*c* and a fourth radiator 160*d*. The length L and the distance D of a first radiator 120*c*, the second radiator 160*c*, a third radiator 120*d*, and the fourth radiator 160*d* of the array antenna 100*b* in this embodiment are the same as the above embodiment. The array antenna 100*b* has the effect similar to effects in the above embodiments.

In other words, the separation or integration of the first dielectric element 110*c*, the third dielectric element 110*d*, the second dielectric element 150*c*, and the fourth dielectric element 150*d* will not affect the effect of the array antenna 100*b*, which may be chosen by the user according to the requirements.

Figure 4:
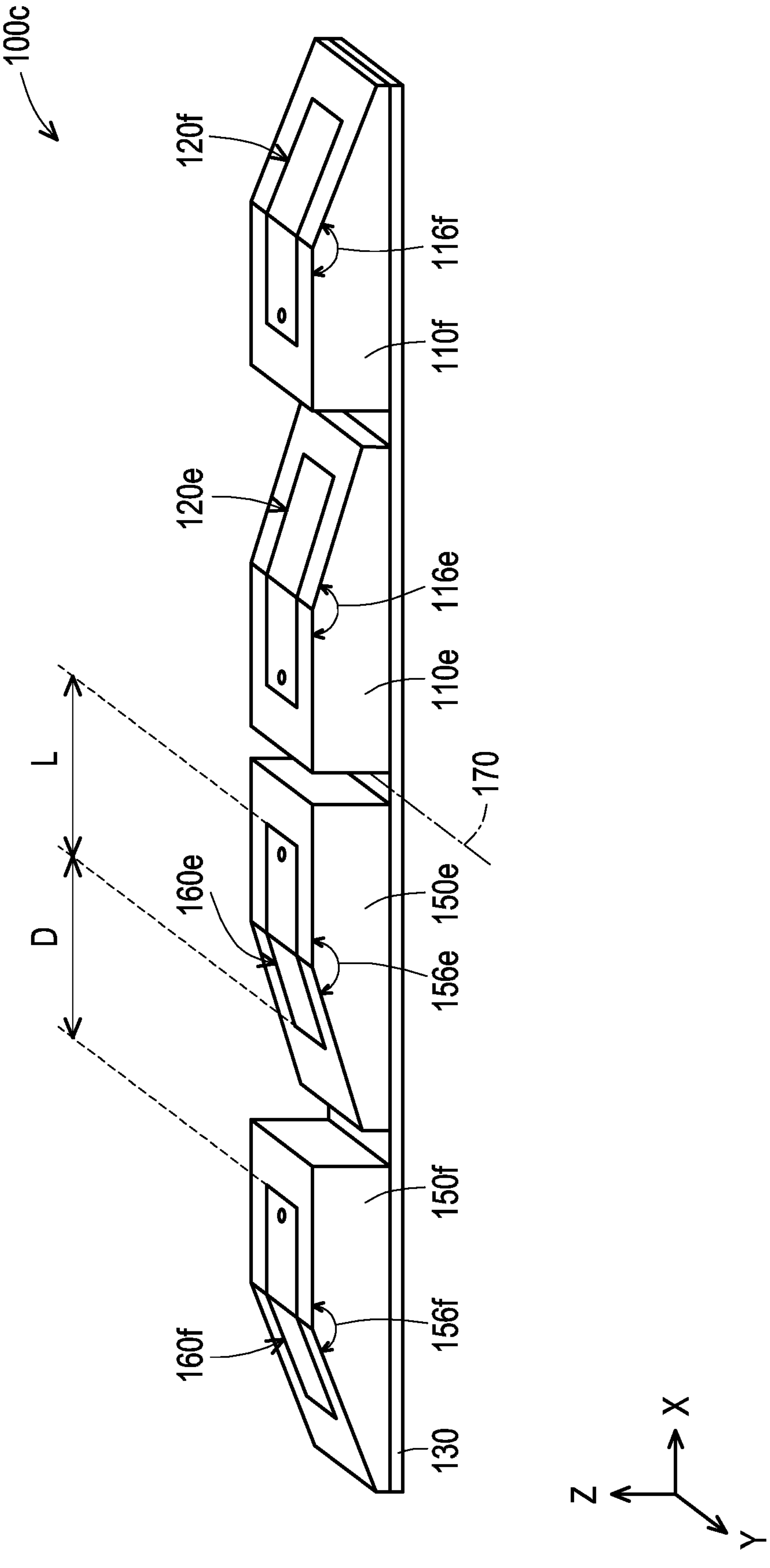
FIG. 4 is a schematic view of an array antenna according to another embodiment of the disclosure.

FIG. 4 is a schematic view of an array antenna according to another embodiment of the disclosure. Referring to both FIGS. 1C and 4, an array antenna 100*c* in this embodiment is similar to the array antenna 100*a*2. The difference between the two is that in this embodiment, a first included angle 116*e* of a first dielectric element 110*e* of the array antenna 100*c* is the same as a second included angle 156*e* of a second dielectric element 150*e*; a third included angle 116*f* of a third dielectric element 110*f* is the same as a fourth included angle 156*f* of a fourth dielectric element 150*f*, and the first included angle 116*e* is different from the third included angle 116*f*. In other words, an inclination of the first dielectric element 110*e* and the second dielectric element 150*e* in the first set of dielectric elements of the array antenna 100*c* in this embodiment is different from an inclination of the third dielectric element 110*f* and the fourth dielectric element 150*f* in the second set of dielectric elements.

In view of the above, an inclination of a first radiator 120*e* and a second radiator 160*e* in the first set of radiators of the array antenna 100*c* in this embodiment is different from an inclination of a third radiator 120*f* and a fourth radiator 160*f* in the second set of radiators. Therefore, a beamforming bandwidth and a radiation coverage area of the array antenna 100*c* in this embodiment are different from the beamforming bandwidths and the radiation coverage areas in the above embodiments. The user may use the first dielectric element 110*e*, the third dielectric element 110*f*, the second dielectric element 150*e*, and the fourth dielectric element 150*f* with different inclinations to change a radiant energy range of the array antenna 100*c* according to the requirements thereof.

Based on the above, the first dielectric element of the array antenna in the disclosure includes the first surface and the second surface inclined to the first surface, and the second part of the first radiator is disposed on the second surface. The second dielectric element includes the third surface and the fourth surface inclined to the third surface, and the fourth part of the second radiator is disposed on the fourth surface. The first included angle of the first dielectric element is the same as the second included angle of the second dielectric element. In the array antenna, the beamforming bandwidth of the array antenna is increased through the inclined second part and the inclined fourth part, so that the coverage area of the radiant energy range of the array antenna is increased. In addition, the array antenna further includes the third dielectric element and the fourth dielectric element, and the third included angle of the third dielectric element is the same as the fourth included angle of the fourth dielectric element. The beamforming bandwidth and the radiation coverage area of the array antenna may be further changed by the third dielectric element and the fourth dielectric element.

In addition, the first included angle and the second included angle may be different from the third included angle and the fourth included angle, so that the array antenna has the first dielectric element, the second dielectric element, the third dielectric element, and the fourth dielectric element with different inclinations to change the beamforming bandwidth and the coverage area of the radiant energy range of the array antenna, and that the array antenna in the disclosure may have a variety of different beamforming bandwidths and radiant energy ranges to meet different usage requirements.

What is claimed is:

1. An array antenna comprising:

a ground plane;

a first dielectric element disposed on the ground plane, wherein the first dielectric element comprises a first surface and a second surface, and a first included angle is formed between the first surface and the second surface;

a second dielectric element disposed on the ground plane, wherein the second dielectric element comprises a third surface and a fourth surface, a second included angle is formed between the third surface and the fourth surface, the first dielectric element and the second dielectric element are mirrored, and the first surface is adjacent to the third surface;

a first radiator comprising a first part and a second part, wherein the first part is disposed on the first surface and comprises a first feeding end, and the second part is disposed on the second surface; and a second radiator comprising a third part and a fourth part, wherein the third part is disposed on the third surface and comprises a second feeding end, and the fourth part is disposed on the fourth surface, the first included angle and the second included angle are less than 180 degrees.

2. The array antenna according to claim 1, wherein the first included angle and the second included angle are between 135 degrees and 175 degrees.

3. The array antenna according to claim 1, wherein the first included angle is the same as the second included angle.

4. The array antenna according to claim 1, wherein the first surface and the third surface are parallel to the ground plane.

5. The array antenna according to claim 1, wherein an area of the first part is the same as an area of the second part, and an area of the third part is the same as an area of the fourth part.

6. The array antenna according to claim 1, wherein the first dielectric element and the second dielectric element are disposed at intervals.

7. The array antenna according to claim 1, wherein the first dielectric element is connected to the second dielectric element to form a whole.

8. The array antenna according to claim 1, wherein the array antenna excites at a frequency band, a length of the first radiator is ½ wavelength of the frequency band, and a length of the second radiator is ½ wavelength of the frequency band.

9. The array antenna according to claim 1, wherein the array antenna excites at a frequency band, and a distance between the first radiator and the second radiator is ½ wavelength of the frequency band.

10. The array antenna according to claim 1, further comprising:

a third dielectric element disposed on the ground plane, wherein the third dielectric element comprises a fifth surface and a sixth surface, a third included angle is formed between the fifth surface and the sixth surface, and the third dielectric element is disposed on one side of the first dielectric element opposite to the second dielectric element;

a fourth dielectric element disposed on the ground plane, wherein the fourth dielectric element comprises a seventh surface and an eighth surface, a fourth included angle is formed between the seventh surface and the eighth surface, the third dielectric element and the fourth dielectric element are mirrored, and the fourth dielectric element is disposed on one side of the second dielectric element opposite to the first dielectric element;

a third radiator disposed on the third dielectric element; and a fourth radiator disposed on the fourth dielectric element.

11. The array antenna according to claim 10, wherein the third included angle, the fourth included angle, the first included angle, and the second included angle are the same.

12. The array antenna according to claim 10, wherein the third included angle is the same as the fourth included angle, the first included angle is the same as the second included angle, and the third included angle is different from the first included angle.

* * * * *